Patented Nov. 8, 1938

2,135,745

UNITED STATES PATENT OFFICE 2,135,745

GLUE AND PROCESS OF MANUFACTURE THEREFOR

Charles N. Cone, Portland, Oreg., assignor to M and M Plywood Corporation, Portland, Oreg., a corporation of Oregon No Drawing. Application August 15, 1934, Serial No. 739,862

14 Claims. (Cl. 134—23.8)

This invention relates to a waterproof and strongly adhesive glue.

The objects of the invention include among others the provision of a cheap waterproof glue suitable for commercial veneer work and the like, a glue which will discolor wood but slightly and which may readily be spread by gluing rolls, a glue which will produce a strong and lasting bond and that may be readily prepared and in which the preparation steps are not critical except as recited by the claims. Other objects will appear from the description of the new glue hereinafter set forth.

Cottonseed flour is the principal ingredient of the new glue. Such flour is produced by grinding and sifting cottonseed cake left after the oil has been expressed. Flour of a fineness that 50% of it will pass through a 200 mesh screen and not more than 10% will fail to pass through a 100 mesh screen is preferred. Sifting the ground cake to produce flour of suitable fineness removes most of the hull and linter. The hull contains very little protein and the linter none, hence the protein content of the flour is higher than that of the cake.

Blood albumin is a second ingredient of the glue. Such blood albumin is of the soluble variety, as contrasted with the ordinary blood meal in which the albumin has been rendered insoluble by heat. Either a spray dried or a flake dried type of soluble blood albumin may be used. If the flake dried albumin is used, it should be ground to facilitate solution. A fineness for the blood alubumin that allows it to pass through a 30 mesh screen appears suitable.

The cottonseed flour and the blood albumin may be combined with dipentene to prevent the glue from foaming. They may also be combined with sodium metasilicate. The sodium metasilicate generally is of the formula $NA_2SiO_3.5H_2O$. The water of crystallization may be eliminated. Such metasilicate differs from the ordinary waterglass in that waterglass is a variable mixture or colloidal solution of $NA_2SiO_3$ with $SiO_2$ in water. The ordinary waterglass is not a true sodium salt.

Different formulas for and methods of making the new glue follow:

Formula Number 1

A dry mixture is made from 80 pounds of cottonseed flour, 20 pounds of dry soluble blood albumin, and 2 pounds of dipentene. These ingredients are thoroughly mixed. To this mixture is added 350 pounds of water. The water should be added with constant stirring to avoid formation of lumps. Thereafter 37 pounds of sodium metasilicate dissolved in 50 pounds of water is added, and the mixture stirred for ten minutes. Next 7 pounds of hydrated lime suspended in 25 pounds of water is added, and the stirring continued for a time. Finally, about 20 more pounds of water is added and stirred into the mix. The glue is then ready for use.

Formula Number 2

A dry mixture is made from 80 pounds of cottonseed flour, 20 pounds of dry soluble blood albumin, 1½ pounds of sodium fluoride, 2 pounds of soda ash, and 2 pounds of dipentene. These ingredients are well mixed. To the mixture is added 330 pounds of water. The material is stirred well to avoid lumps. After about 2 minutes of stirring, there is added 28½ pounds of sodium metasilicate dissolved in 50 pounds of water. After stirring for ten minutes, there is added 10 pounds of hydrated lime suspended in 25 pounds of water. After a few minutes of stirring, 20 more pounds of water is added and stirred in. The glue then is ready for use.

Formula Number 3, for a slightly different glue

A dry mixture is made from 80 pounds of cottonseed flour, 20 pounds of dried blood albumin, 6½ pounds of sodium fluoride, 7½ pounds of soda ash, and 2 pounds of dipentene. These are thoroughly mixed. To this is added 325 pounds of water with thorough stirring, the stirring being continued about ten minutes. Then 14 pounds of lime suspended in 25 pounds of water is added. Stirring is continued for ten minutes, after which 30 pounds of water is added. The glue is then ready for use.

The fluidity of each glue depends on the amount of water present. This amount may be varied within obvious limits.

The preferred temperature for the finished wet glue is about 80 degrees, Fahrenheit. If, in Formulas 1 and 2 above, the sodium metasilicate is dissolved in hot water, the temperature of the remainder of the water may be lower than 80 degrees, say about 70, in order to bring the temperature of the finished glue to the right point.

The glue may be used over a wide range of temperatures. If the temperature is too low, the necessary chemical reactions take place slowly. If the temperature is too high, the protein hydrolyzes, ammonia is given off, and the strength and water resistant properties of the glue are reduced.

When the glue is spread by mechanical means, such as rollers, there is a tendency to produce foam. The foam interferes with the spreading properties of the glue. To avoid foaming, dipentene is added. Pine oil, sulphonated castor oil or like ingredients may be used in place of dipentene. The proportions indicated in the formulas appear to reduce foaming to a minimum, without interfering with the other properties of the glue. When desired, the anti-foaming agent may be added to the first water or to the wet glue mixture instead of to the dry mixture.

This improved glue, particularly under Formulas 1 and 2, produces a bond of excellent strength when used in a cold process. It appears to be stronger than the more expensive plain blood albumin glue. It is decidedly more waterproof than the glue made with cottonseed flour alone, or soy bean flour or casein, which are more expensive than the cottonseed.

In preparation and use, the new glue is exceptionally "fool proof". In ordinary glues, great care is necessary in combining water with a dry mix to avoid the formation of lumps. Violent agitation of the water is necessary while the dry ingredients are sifted in. The mixture of other glues is usually thick and heavy, necessitating mechanical mixing means.

This new glue has slight tendency to lump and is of a watery consistency during mixing so that it is easy to stir in the additional ingredients. After the ingredients are all in and thoroughly mixed, the glue thickens to a proper consistency. As a consequence, this improved glue may be made up by hand with a wooden paddle and without the use of power driven mixers.

In contrast with other glues, which require an amount of lime about equivalent chemically to the sodium hydroxide or other ordinarily used chemical, this new glue requires lime in amounts not exceeding one-half the chemical equivalent of the sodium salt used. The use of this small quantity of lime avoids excessive staining of the wood. In Formula Number 1, the amount of lime can be reduced from 7 pounds to 1 pound to further reduce staining. This reduction in lime lowers also the water resistance and the dry adhesive strength of the glue somewhat but such glue is still satisfactory and particularly so for thin surface face veneers and the like where staining is a serious matter.

Where it is desired to use freshly drawn blood in place of the dried blood, the liquid blood must be defibrinated or be preserved with chemicals. The amounts of wet blood employed should be equivalent to the amount of dried albumin indicated. The amount of water in the remainder of the mixture must be adjusted to allow for the fresh blood. It is believed that sodium fluoride is satisfactory to prevent clotting of the blood since coagulation will not take place if 2% of fluoride, based on the quantity of wet blood, is added. The fluoride does not interfere with the glue making properties.

Other flours similar to cottonseed flour may be used. These include peanut, Sesame, sunflower seed and perilla seed. Cottonseed is believed to be superior to the others named.

Potassium compounds may be used in place of the sodium compounds, if desired, but no advantage accrues from the change unless possibly it be from the slightly greater solubility of the potassium compounds.

It will be found advantageous to mix the sodium salts with the dry glue base and water very thoroughly before adding the lime. This appears to add materially to the desirable qualities of the glue and to bring the entire mixture to the proper consistency with less water than would otherwise be required.

In connection with the invention herein disclosed, reference should be had to United States Letters Patent Number 1,976,436, dated October 9, 1934, to Charles N. Cone, assignor to I. F. Lauks, Inc.

What is claimed as new and is desired to be secured by Letters Patent of the United States is:

1. A glue comprising the reaction product of cottonseed flour in major proportion, water soluble blood albumin, sodium fluoride, soda ash, sodium metasilicate, and hydrated lime in an amount less than the amount of lime chemically equivalent to the sodium compounds.

2. The method of making waterproof glue comprising mixing, without water, cottonseed flour, water soluble blood albumin, sodium fluoride, soda ash and an antifoaming agent and thereafter adding water, sodium metasilicate in aqueous solution, and hydrated lime in an amount less than the amount chemically equivalent to the sodium compounds and suspended in water, to the mixture.

3. The method of making waterproof glue comprising mixing, without water, 80 parts by weight of cottonseed flour, 20 parts by weight of dry water-soluble blood albumin, and 2 parts by weight of an antifoaming agent, stirring in 350 parts by weight of water, adding 37 parts by weight of sodium metasilicate dissolved in 50 parts by weight of water, stirring, adding 7 parts by weight of hydrated lime suspended in 25 parts by weight of water, stirring, and adding water to bring the mixture to glue consistency.

4. The method of making waterproof glue which comprises mixing, without water, 80 parts by weight of cottonseed flour, 20 parts by weight of dry water-soluble blood albumin, 1½ parts by weight of sodium fluoride, 2 parts by weight of soda ash, and 2 parts by weight of dipentene, mixing therewith 330 parts by weight of water, adding thereto 28½ parts by weight of sodium metasilicate dissolved in 50 parts by weight of water, adding 10 parts by weight of hydrated lime suspended in 25 parts by weight of water, and adding water to produce a glue consistency.

5. The method of making waterproof glue which comprises mixing, without water, 80 parts by weight of cottonseed flour, 20 parts by weight of dry water soluble blood albumin, 6½ parts by weight of sodium fluoride, 7½ parts by weight of soda ash, and 2 parts by weight of dipentene, mixing in 325 parts of weight of water, adding 14 parts by weight of lime suspended in 25 parts by weight of water, and adding water to produce a glue consistency.

6. A water-proof glue for mechanical application comprising a glue base of vegetable protein and animal albumin, and having dipentene added to reduce foaming.

7. A water-proof glue for mechanical application comprising a glue base of vegetable protein, animal albumin, and alkali metal compounds, and having dipentene added to reduce foaming.

8. A glue comprising the reaction product of cottonseed flour in major proportion, water soluble blood albumin, sodium metasilicate, and hydrated lime in an amount not exceeding one-half the amount chemically equivalent to the sodium metasilicate.

9. The method of making waterproof glue which comprises the steps of mixing, without water, cottonseed flour, water soluble blood albumin, and an antifoaming agent, adding water, adding sodium metasilicate in aqueous solution, and then hydrated lime suspended in water and in an amount not exceeding one-half the amount chemically equivalent to the sodium metasilicate to such mixture.

10. The method of making waterproof glue which comprises the steps of mixing without water cottonseed flour, water soluble blood albumin, and an antifoaming agent, adding water, adding first sodium metasilicate in aqueous solution, and then hydrated lime suspended in water and in an amount not exceeding one-half the amount chemically equivalent to the sodium metasilicate to such mixture.

11. A glue comprising the reaction product of cottonseed flour, water-soluble blood albumin, sodium metasilicate and hydrate of lime in which the amount of the lime does not exceed one-half the amount chemically equivalent to the sodium metasilicate and is added after the mixture of the other elements and in which the ratio of cottonseed flour to blood albumin should not be greater than 30 to 7.

12. A glue comprising the reaction product of cottonseed flour in major proportion, water soluble blood albumin, sodium metasilicate, and hydrated lime in an amount less than the amount of lime chemically equivalent to the sodium metasilicate.

13. The method of making a water resistant glue comprising mixing, without water, cottonseed flour, water soluble blood albumin, and thereafter adding water, and then adding first sodium metasilicate in aqueous solution and then hydrated lime suspended in water to such mixture.

14. The method of making a water resistant glue comprising mixing, without water, cottonseed flour, water soluble blood albumin, and thereafter adding water, and then adding first sodium metasilicate in aqueous solution and then hydrated lime suspended in water to such mixture, the lime being in an amount less than the amount of lime chemically equivalent to the sodium metasilicate.

CHARLES N. CONE.